(12) United States Patent
Purcocks

(10) Patent No.: US 7,723,631 B2
(45) Date of Patent: May 25, 2010

(54) KEYBOARDS

(76) Inventor: Dale McPhee Purcocks, 1/2 Brookfield Terrace, Blackrock, County Dublin (IE)

( * ) Notice: Subject to any disclaimer, the term of this patent is extended or adjusted under 35 U.S.C. 154(b) by 287 days.

(21) Appl. No.: 10/596,714

(22) PCT Filed: Dec. 6, 2004

(86) PCT No.: PCT/IB2004/004020

§ 371 (c)(1),
(2), (4) Date: Jan. 15, 2007

(87) PCT Pub. No.: WO2005/066984

PCT Pub. Date: Jul. 21, 2005

(65) Prior Publication Data

US 2007/0147934 A1    Jun. 28, 2007

(30) Foreign Application Priority Data

Dec. 24, 2003  (GB) ................. 0329985.6

(51) Int. Cl.
*H01H 13/70*  (2006.01)
(52) U.S. Cl. ............... 200/345; 200/341; 200/5 A
(58) Field of Classification Search ........... 200/5 A, 200/302.1, 302.2, 512–514, 517, 341–345; 400/490–496; 29/622; 341/22; 345/168, 345/169
See application file for complete search history.

(56) References Cited

U.S. PATENT DOCUMENTS

| 4,021,630 A | 5/1977 | Taylor | 200/159 B |
|---|---|---|---|
| 4,352,968 A | 10/1982 | Pounds | 200/302 |
| 4,441,001 A | 4/1984 | Miyano et al. | 200/308 |
| 4,527,030 A | 7/1985 | Oelsch | 200/306 |
| 4,590,342 A * | 5/1986 | Schlegel | 200/341 |
| 4,641,004 A | 2/1987 | Keprda | 200/340 |
| 4,705,925 A | 11/1987 | Vermeulen | 200/340 |
| 4,775,574 A | 10/1988 | Fukushima et al. | 428/209 |
| 5,144,103 A | 9/1992 | Suwa | 200/344 |
| 5,145,058 A | 9/1992 | Lee | 200/517 |
| 5,172,805 A | 12/1992 | Gumb | 200/341 |
| 5,247,143 A | 9/1993 | Suwa | 200/517 |
| 5,345,051 A | 9/1994 | Miike | 200/345 |
| 5,389,755 A | 2/1995 | Chen | 200/341 |
| 5,399,824 A | 3/1995 | Chen | 200/534 |
| 5,401,929 A | 3/1995 | Chen | 200/534 |
| 5,442,151 A | 8/1995 | Strang et al. | 200/302.2 |
| 5,710,397 A | 1/1998 | Liao | 200/5 A |
| 5,939,690 A | 8/1999 | Yasui et al. | 200/302.2 |
| 5,950,810 A * | 9/1999 | Pan et al. | 200/344 |
| 6,166,662 A * | 12/2000 | Chuang | 341/22 |
| 6,204,459 B1 | 3/2001 | Kizele et al. | 200/302.1 |
| 6,880,995 B2 * | 4/2005 | Cheng | 400/491.2 |

(Continued)

FOREIGN PATENT DOCUMENTS

DE    3241159    5/1984

(Continued)

*Primary Examiner*—Michael A Friedhofer
(74) *Attorney, Agent, or Firm*—Waddey & Patterson, P.C.; Emily A. Shouse; Ryan D. Levy

(57) ABSTRACT

A switch useful for, inter alia, a touch type keyboard or keypad which may be used for a personal computer or the like in a substantially waterproof form while being relatively inexpensive to manufacture.

15 Claims, 3 Drawing Sheets

U.S. PATENT DOCUMENTS

| | | | |
|---|---|---|---|
| 6,919,524 B2 * | 7/2005 | Imamura et al. | 200/512 |
| 7,009,127 B2 * | 3/2006 | Hoelzle et al. | 200/315 |
| 7,022,929 B1 * | 4/2006 | Snider | 200/512 |
| 2002/0013990 A1 | 2/2002 | Yeh | 29/412 |

FOREIGN PATENT DOCUMENTS

| | | |
|---|---|---|
| DE | 3722236 | 1/1989 |
| EP | 0 210 973 | 2/1987 |
| GB | 2 157 491 | 10/1985 |
| JP | 2001-283681 | 10/2001 |
| WO | WO 03/097322 | 11/2003 |

* cited by examiner

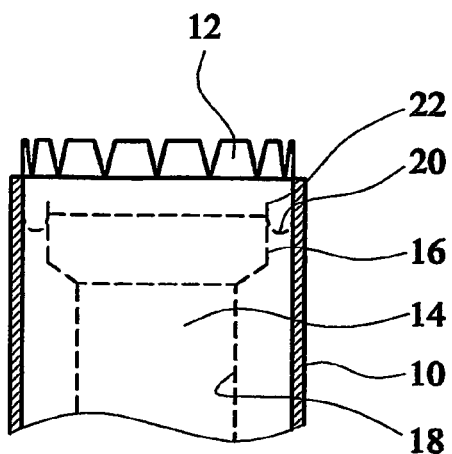
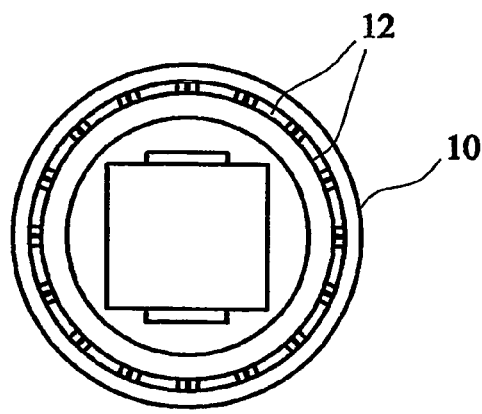
FIG. 1
FIG. 2
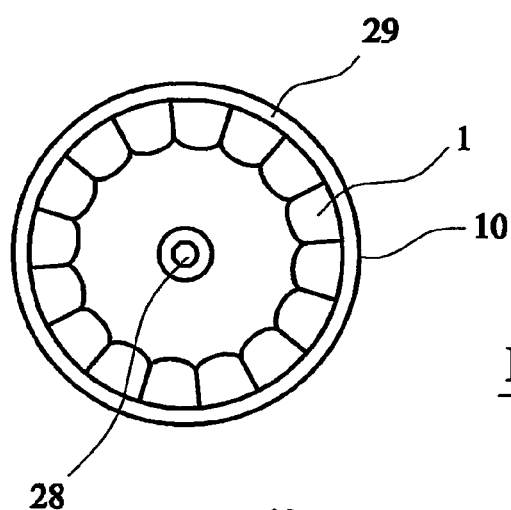
FIG. 3
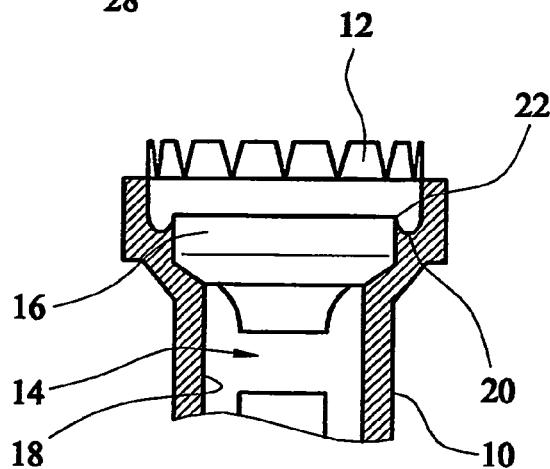
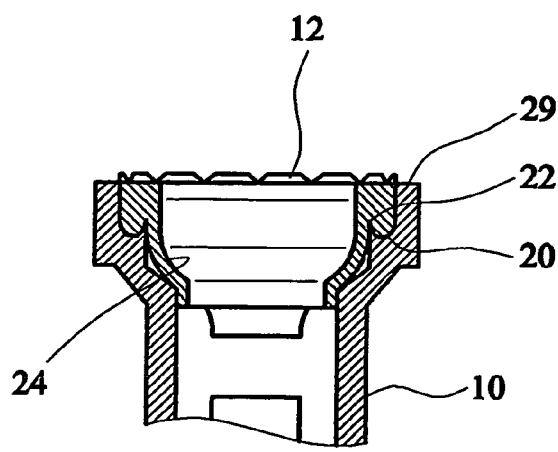
FIG. 4
FIG. 5

KEYBOARDS

This application is a National Stage application filed under 371 based on PCT\IB2004\004020 filed on Dec. 6, 2004 which claims priority to GB 0329985.6 filed Dec. 24, 2003.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATED-BY-REFERENCE OF MATERIALS SUBMITTED ON A COMPACT DISK

Not Applicable.

BACKGROUND OF THE INVENTION

1. Field of The Invention

This invention relates to keyboards, keypads, and the like, and more particularly, to a switch for a touchtype keyboard or keypad, for use with, for example, a personal computer or the like.

2. Description of Related Art Including Information Disclosed Under 37 CFR 1.97 And 1.98.

In essence, a keyboard for a computer comprises a series of switches connected to a microprocessor that monitors the state of each switch and initiates a specific response to a change in that state.

In a typical keyboard, a key matrix is provided which comprises a grid of circuits underneath the keys, whereby each circuit is broken at the point below a specific key. Pressing the key bridges the gap in the circuit, allowing a tiny amount of current to flow through. The processor monitors the key matrix for signs of continuity at any point on the grid. When it finds a circuit that is closed, it compares the location of that circuit on the key matrix to a character map in its ROM. The character map is basically a comparison chart for the processor that tells it what the key at x,y coordinates in the key matrix represents.

Keyboards rely on switches that cause a change in the current flowing through the circuits in the keyboard. When the key presses the keyswitch against the circuit, there is usually a small amount of vibration between the surfaces, known as bounce. The processor in the keyboard recognises that this very rapid switching on an off is not caused by repeated pressing of the same key, and filters such tiny fluctuations out of the signal and treats it as a single key press.

Keyboards use a variety of switch technologies, although it is interesting to note that a user tends to like to have some audible and tactile response when typing on the keyboard. Such different technologies include: rubber dome mechanical, capacitive non-mechanical, metal contact mechanical, membrane mechanical and foam element mechanical.

Probably the most popular switch technology in use today is rubber dome. In such keyboards, each key sits over a small, flexible rubber dome with a hard carbon centre.

When the key is pressed, a plunger in the bottom of the key pushes down against the dome. This causes the carbon centre to push down also, until it presses against the hard flat surface beneath the key matrix. As long as the key is held, the carbon centre completes the circuit for that portion of the matrix. When the key is released, the rubber dome springs back to its original shape, forcing the key back up to its rest position.

Rubber dome switch keyboards are inexpensive, have relatively good tactile response and are fairly resistant to spills and corrosion because of the rubber layer covering the key matrix. Membrane switches are very similar in operation to rubber dome keyboards. A membrane keyboard does not, however, have separate keys. Instead, it has a single rubber sheet with bulges for each key, and are often used in devices designed for heavy industrial use or extreme conditions. However, because they offer little or no tactile response and can be somewhat difficult to manipulate, these keyboards are seldom found on normal computer systems. Furthermore, the membrane cannot be used if even one of the bulges is defective, and each pad moulding is specific to a particular keyboard design.

Waterproofing a keypad suitable for machine controls by clamping the periphery of the elastomeric pad between the top and bottom shells of the keypad has been proposed in the past. However, such keypads do not have, nor are they intended to have, a touch type feel, and there has been no disclosure or suggestion as to how such proposals could be practically applied to much larger, high volume, touch type keyboards.

Although, as stated above, rubber dome switch keyboards are relatively fairly resistant to spills and corrosion because of the rubber layer covering the key matrix, they are not waterproof, and a keyboard will, therefore malfunction due to a short circuit if liquid enters the keyboard. Nevertheless, the rubber dome keyboards remain one of the most popular types of keyboard because of their relatively good tactile response.

In an attempt to provide a waterproof dome switch keyboard, some arrangements have been proposed. However, such arrangements tend to a have a complex structure, are costly to manufacture and, in any event, are still not completely waterproof, such that liquid can still enter and cause a short circuit.

For example, in the arrangement disclosed in U.S. Pat. No. 4,705,925 use is made of individual domes. Each dome is secured in a keycap housing to facilitate handling and assembly. The base of each dome in an assembly is pressed against the membrane to exclude dust, but by doing so affects the feel of the keys because of air pressure inside the dome. Such sealing does not, in any event, waterproof the keyboard. U.S. Pat. No. 4,021,630 describes a switch for a surgical knife in which a dome is clamped between a housing and the membrane to effect a waterproof seal, but it is not intended to have a touch type feel, and would not be practically suitable for use in a computer keyboard or the like.

It is therefore an object of the present invention to provide a switch for a keyboard, which is completely waterproof, whilst also being relatively simple in construction and inexpensive to manufacture.

BRIEF SUMMARY OF THE INVENTION

According to a first aspect of the present invention, there is provided a switch comprising a generally tubular housing, and a dome member having an annular rib extending from the base of said dome member, the dome member being disposed within said housing and being elastically deformable in use, said housing having an inner annular groove for receiving said annular rib of said dome member, wherein said housing is provided with a plurality of discrete tabs disposed circumferentially around an end thereof, said tabs being movable from an open configuration in which said dome member can be introduced into said housing, and a sealed configuration in which they substantially cover the base of said dome member so as to clamp said annular rib of said dome member within said annular groove and create a fluid-tight seal between said housing and said dome member.

In accordance with a second aspect of the present invention, there is provided a switch comprising a generally tubular housing, and a dome member having an annular rib extending from the base of said dome member, the dome member being disposed within said housing and being elastically deformable in use, said housing having an inner annular groove for receiving said annular rib of said dome member, wherein said housing is provided with clamping means which are movable from an open configuration in which said dome member can be introduced into said housing, and a sealed configuration in which they substantially cover the base of said dome member so as to clamp said annular rib of said dome member within said annular groove and create a fluid-tight seal between said housing and said dome member, at least a portion of the dome member being received within said housing with sufficient clearance such that it does not contact the inner wall of the housing when it is deformed in use.

In a preferred embodiment, the tabs are provided substantially all of the way around the circumference of an end of the housing, and are beneficially permanently deformable from the open configuration to the sealed configuration so as to form an annular flange covering the base of the dome member. Such deformation may be effected by means of heat and/or force. Preferably, in the sealed configuration, the tabs are substantially at right-angles to the longitudinal side wall of the housing, and substantially flush with the end thereof, such that excessive deformation of the dome portion is not required to make the desired contact.

In a preferred embodiment, the inside of the housing has a wider portion shaped and configured to receive the dome member and a narrower portion leading to an aperture, a key cap being slidably engaged therein and arranged to selectively deform and release the dome member, when in use. One or more apertures or slots are preferably provided in said narrower portion of the housing to allow any moisture which enters the housing beneath the keycap to escape. The annular groove is beneficially provided with a relatively sharp edge which corresponds to an intersection between said annular rib and the remainder of the dome member.

The present invention also extends to a keyboard including a plurality of switches as defined in accordance with the first and/or second aspects of the present invention. In this case, the keyboard preferably comprises a board member defining a plurality of such switches connected together or formed integrally with each other.

In accordance with a third aspect of the present invention, there is provided a dome member for use in a switch, said dome member being elastically deformable in use and having an annular rib extending from the base thereof, said annular rib being of a thickness greater than that of the side walls of said dome member, wherein generally V-shaped groove defines the intersection between said annular rib and said side walls of said dome member.

Preferably the edge of the annular groove of the housing is disposed within the V-shaped groove of the dome member, at the apex thereof, so as to facilitate the fluid-tight sealing between the apex thereof, so as to facilitate the fluid-tight sealing between the housing and the dome member.

The first aspect of the present invention further extends to a method of manufacturing a switch, comprising providing a generally tubular housing, providing a dome member having an annular rib extending from the base of said dome member within said housing, said dome member being elastically deformable in use, said housing having an inner annular groove for receiving said annular rib of said dome member, wherein said housing is provided with a plurality of discrete tabs disposed circumferentially around an end thereof, the method further comprising moving said tabs from an open configuration in which said dome member is introduced into said housing, and a sealed configuration in which they substantially cover the base of said dome member so as to clamp said annular rib of said dome member within said annular groove and create a fluid-tight seal between said housing and said dome member.

The second aspect of the present invention further extends to a method of manufacturing a switch, comprising providing a generally tubular housing, and providing a dome member having an annular rib extending from the base of said dome member within said housing, said dome member being elastically deformable in use, said housing having an inner annular groove for receiving said annular rib of said dome member, wherein said housing is provided with clamping means, the method further comprising moving said clamping means from an open configuration in which said dome member is introduced into said housing, and a sealed configuration in which they substantially cover the base of said dome member so as to clamp said annular rib of said dome member within said annular groove and create a fluid-tight seal between said housing and said dome member, at least a portion of the dome member being received within said housing with sufficient clearance such that it does not contact the inner wall of the housing when it is deformed in use.

These and other aspects of the present invention will be apparent from, and elucidated with reference to the embodiment described herein.

BRIEF DESCRIPTION OF THE SEVERAL VIEWS OF THE DRAWINGS

An embodiment of the present invention will now be described by way of example only and with reference to the accompanying drawings, in which:

FIG. 1 is a front view of a switch housing according to an exemplary embodiment of the present invention;

FIG. 2 is a plan view of the switch housing of FIG. 1;

FIG. 3 is a plan view of a switch according to an exemplary embodiment of the present invention;

FIG. 4 is a schematic cross-sectional view of the switch housing of FIG. 1;

FIG. 5 is a schematic cross-sectional view of the switch of FIG. 3;

DETAILED DESCRIPTION OF THE INVENTION

Figure 6:
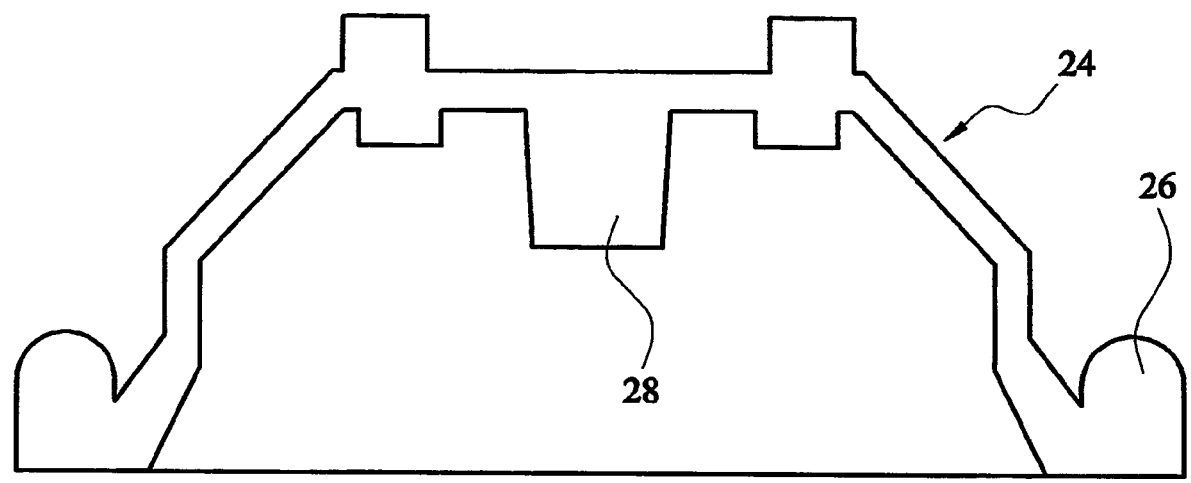
FIG. 6 is a schematic cross-sectional view of a dome member for use in a switch according to an exemplary embodiment of the present invention.
Figure 7:
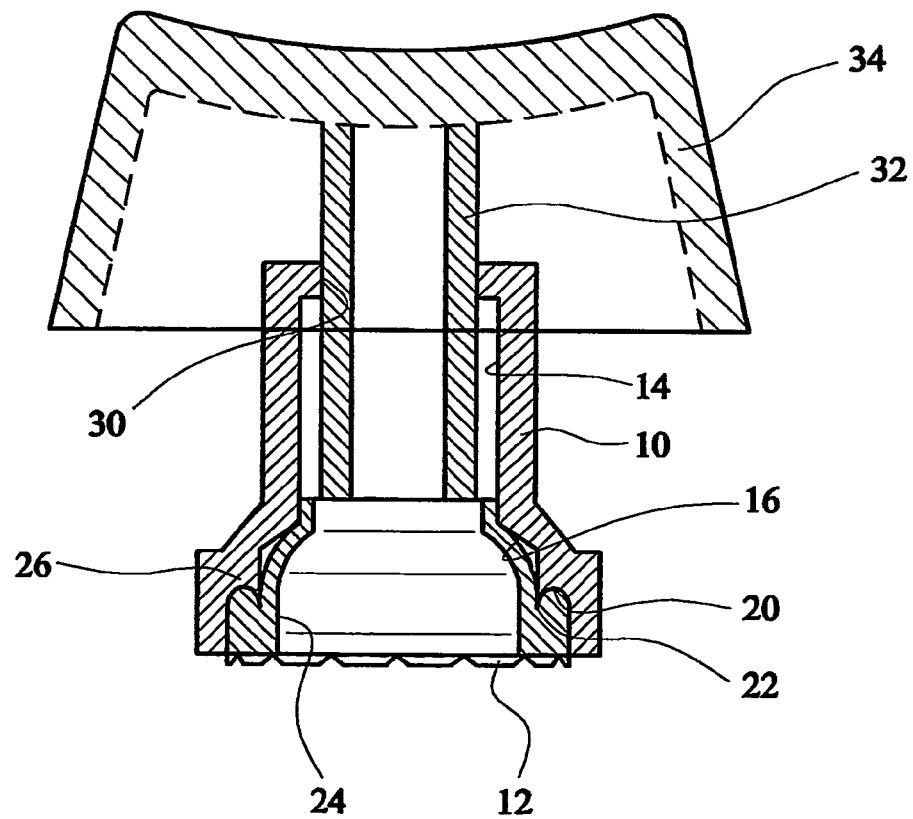
FIG. 7 is a cross-sectional view of a switch according to an exemplary embodiment of the present invention, including a keycap.

Referring to FIGS. 1, 2 and 4 of the drawings, a switch according to an exemplary embodiment of the present invention comprises a generally tubular housing 10 of a rigid plastics material. A plurality of discrete tabs 12 (or 'petals') are circumferentially disposed, in side-by-side relation, around an end of the housing 10. The housing 10 defines a channel 14, having a wider, generally cup-shaped portion 16 for receiving an elastomeric dome member and a narrower portion 18. An annular groove 20, with a relatively sharp edge 22 is provided within the housing in the wider portion 16 thereof.

Referring to FIGS. 3 and 5 of the drawings, during assembly, an elastomeric dome member 24 is inserted in the wider portion 16 of the recess 14 within the housing. Referring in addition to FIG. 6 of the drawings, the dome member 24 is provided with an annular rib 26 around its base, the rib 26 having a greater thickness than that of the rest of the dome 24. A contact member 28 is provided generally centrally on the upper, inner surface of the dome member 24.

Referring back to FIGS. 3 and 5, when the dome member 24 is correctly inserted within the housing 10, the annular rib 26 thereof sits within the annular groove 20 within the housing 10, with the sharp edge 22 being located at the intersection between the rib 26 and the rest of the dome member 24. Next, a downward force is provided on the tabs 12, causing them to 'fold' down over the base of the dome member 24, such that they are substantially at right-angles to the longitudinal sidewall of the housing 10, and substantially flush with the edge portion 29 thereof. Optionally, heat may also be applied to the tabs 12, causing them to at least partially soften and melt together, to form a single, substantially integral, flange completely covering the annular rib 26 at the base of the dome member 24, so as to create a fluid-tight seal between the housing 10 and the dome member 24.

Figure 8:
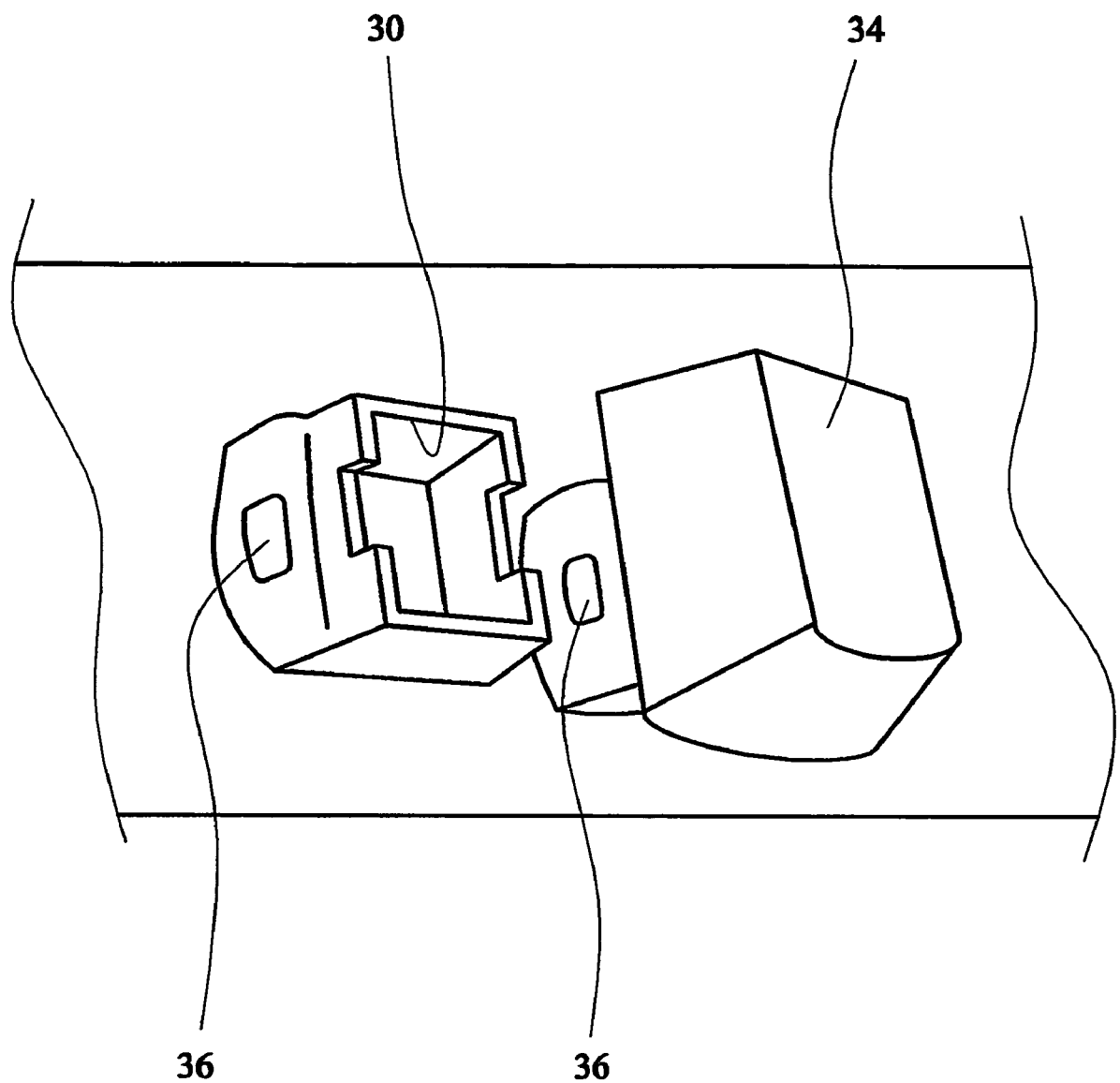
FIG. 8 is a perspective partial view of the upper surface of the upper shell of a keyboard according to an exemplary embodiment of the present invention, illustrating the aperture in the side wall of the narrower portion of the housing.

The end of the housing 10 opposite to that having the tabs 12 is provided with an aperture 30 with which the stem 32 of a keycap 34 is slidably engaged, the stem 32 being communicably coupled with the upper surface of the dome member 24. As shown in FIG. 8, one or more apertures 36 or slots are preferably provided in order to allow any moisture which enters the housing beneath the keycap 34 to escape.

In use, when a user presses the key, the stem 32 pushes the dome member 24 downwards, causing it be deformed, and causing the contact member 28 to move down wards and make complete the desired electrical circuit. When the key is released, the dome member 24 returns to its original configuration and the electrical circuit is broken. It will be appreciated that, in order to preserve the lifetime of the dome, and ensure correct operation thereof, the wider portion 16 of the channel 14 defining the recess for receiving the dome member 24 is shaped and configured so as to provide sufficient clearance such that the dome member 24 does not contact the inner wall of the housing 10 when it is deformed in use.

A keyboard (not shown) employing such switches comprises a single board in which a plurality of housings are integrally formed in the desired configuration. Dome members are placed in each of the housings and the respective tabs are deformed to create fluid-tight seals between each of the housings and the respective dome members. The board is then placed within top and bottom shell parts, together with a key matrix, and respective keycaps are inserted into the apertures in the housings to complete the keyboard. A fluid-tight seal is provided all around the periphery between the top and bottom shell parts. In addition, a battery compartment may be provided in the bottom shell part, which compartment is preferably also provided with a fluid-tight sealing means.

It should be noted that the above-mentioned embodiment illustrates rather than limits the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A switch comprising a generally tubular housing, and a dome member having an annular rib extending from a base of said dome member, the dome member being disposed within said housing and being elastically deformable in use, said housing having an inner annular groove for receiving said annular rib of said dome member, wherein said housing is provided with a plurality of discrete tabs disposed circumferentially around an end thereof, said tabs being movable from an open configuration in which said dome member can be introduced into said housing, and a sealed configuration in which the tabs substantially cover the base of said dome member so as to clamp said annular rib of said dome member within said annular groove and create a fluid-tight seal between said housing and said dome member.

2. A switch according to claim 1, wherein at least a portion of the dome member is received within said housing with sufficient clearance such that the at least a portion does not contact the inner wall of the housing when the dome member is deformed in use.

3. A switch according to claim 1, wherein said tabs are provided substantially all of the way around the circumference of an end of the housing.

4. A switch according to claim 1, wherein said tabs are substantially permanently deformable from the open configuration to the sealed configuration so as to form an annular flange covering the base of the dome member.

5. A switch according to claim 4, wherein deformation of said tabs is effected by means of heat or force.

6. A switch according to claim 1, wherein, in the sealed configuration, the tabs are substantially at right-angles to a longitudinal side wall of the housing and substantially flush with an end thereof.

7. A switch according to claim 1, wherein the inside of the housing has a wider portion shaped and configured to receive the dome member and a narrower portion leading to an aperture, a key cap being slidably engaged therein and arranged to selectively deform and release the dome member, when in use.

8. A switch according to claim 7, wherein said narrower portion of said housing is provided with one or more apertures in sidewalls thereof.

9. A switch according to claim 1, wherein the annular groove is provided with a relatively sharp edge which corresponds to an intersection between said annular rib and the remainder of the dome member.

10. A keyboard including a plurality of switches according to claim 1.

11. A keyboard according to claim 10, comprising a board member defining a plurality of such switches connected together or formed integrally with each other.

12. A switch comprising a generally tubular housing, and a dome member having an annular rib extending from a base of said dome member, the dome member being disposed within said housing and being elastically deformable in use, said housing having an inner annular groove for receiving said annular rib of said dome member, wherein said housing is provided with clamping means which are movable from an open configuration in which said dome member can be introduced into said housing, and a sealed configuration in which the clamping means substantially cover the base of said dome member so as to clamp said annular rib of said dome member within said annular groove and create a fluid-tight seal between said housing and said dome member, at least a portion of the dome member being received within said housing with sufficient clearance such that the at least a portion does not contact the inner wall of the housing when the dome member is deformed in use.

13. A switch according to claim 12, wherein said clamping means comprises a plurality of discrete tabs disposed circumferentially around an end thereof, said tabs being movable from an open configuration in which said dome member can be introduced into said housing, and a sealed configuration in which the tabs substantially cover the base of said dome member so as to clamp said annular rib of said dome member within said annular groove and create a fluid-tight seal between said housing and said dome member.

14. A method of manufacturing a switch, comprising providing a generally tubular housing, providing a dome member having an annular rib extending from a base of said dome member within said housing, said dome member being elastically deformable in use, said housing having an inner annular groove for receiving said annular rib of said dome member, wherein said housing is provided with a plurality of discrete tabs disposed circumferentially around an end thereof, the method further comprising moving said tabs from an open configuration in which said dome member is introduced into said housing, and a sealed configuration in which the tabs substantially cover the base of said dome member so as to clamp said annular rib of said dome member within said annular groove and create a fluid-tight seal between said housing and said dome member.

15. A method of manufacturing a switch, comprising providing a generally tubular housing, and providing a dome member having an annular rib extending from the base of said dome member within said housing, said dome member being elastically deformable in use, said housing having an inner annular groove for receiving said annular rib of said dome member, wherein said housing is provided with clamping means, the method further comprising moving said clamping means from an open configuration in which said dome member is introduced into said housing, and a sealed configuration in which they substantially cover the base of said dome member so as to clamp said annular rib of said dome member within said annular groove and create a fluid-tight clamping means so as to clamp said annular rib of said dome member within said annular groove and create a fluid-tight seal between said housing and said dome member, at least a portion of the dome member being received within said housing with sufficient clearance such that the at least a portion does not contact the inner wall of the housing when the dome member is deformed in use.

\* \* \* \* \*